United States Patent
Eagling et al.

(10) Patent No.: US 7,170,889 B2
(45) Date of Patent: Jan. 30, 2007

(54) SYSTEM AND METHOD FOR EFFICIENTLY USING CHANNEL UNIT HARDWARE TO PROVIDE MULTIPLE NARROWBAND CHANNELS OVERLAID ON A SINGLE WIDEBAND CHANNEL IN A SATELLITE COMMUNICATIONS NETWORK

(75) Inventors: Trevor Eagling, Frederick, MD (US); Sanjay Gupta, Gaithersburg, MD (US)

(73) Assignee: Hughes Network Systems LLC, Germantown, MD (US)

( * ) Notice: Subject to any disclaimer, the term of this patent is extended or adjusted under 35 U.S.C. 154(b) by 1004 days.

(21) Appl. No.: 10/141,109

(22) Filed: May 8, 2002

(65) Prior Publication Data

US 2003/0210661 A1 Nov. 13, 2003

(51) Int. Cl.
*H04L 12/50* (2006.01)
*H04Q 11/00* (2006.01)

(52) U.S. Cl. ...................................... 370/360
(58) Field of Classification Search ................ 370/321, 370/352–354, 535, 441, 350, 370, 522, 523, 370/335, 468, 360, 328, 493, 376, 230, 337, 370/512, 466; 342/37; 455/452, 450, 410; 375/259, 222, 346, 265, 240.19; 725/106, 725/110, 131; 709/203, 223, 228; 340/825.52, 340/870.13; 379/106.03, 93.31

See application file for complete search history.

(56) References Cited

U.S. PATENT DOCUMENTS

| | | | | |
|---|---|---|---|---|
| 4,641,304 A | * | 2/1987 | Raychaudhuri | 370/447 |
| 5,881,105 A | * | 3/1999 | Balachandran et al. | 375/259 |
| 6,044,074 A | * | 3/2000 | Zehavi et al. | 370/350 |
| 6,549,942 B1 | * | 4/2003 | Janky et al. | 709/219 |
| 2001/0021195 A1 | * | 9/2001 | Miller et al. | 370/441 |

* cited by examiner

*Primary Examiner*—Chi Pham
*Assistant Examiner*—Prenell Jones
(74) *Attorney, Agent, or Firm*—Craig Plastrik

(57) ABSTRACT

A system and method for the efficient use of satellite radio modems and satellite bandwidth is disclosed. In the system and method, a satellite radio modem is used for PRACH requests, each PRACH request occupying 31.25 kHz in a packet data transfer channel. The packet data transfer channels can be either 125.0 kHz or 156.25 kHz. Therefore, four PRACH requests can be transmitted in any one packet data transfer channel. The packet data transfer channels are broken into eight time slots, and one time slot in each channel (either the odd frame or even frame) is dedicated to a PRACH request. A satellite radio modem for PDCH transfers is dedicated for each channel. The satellite radio modem assigned to receive the four PRACH requests is timeshared over 16 channels, thereby reducing the amount of satellite radio modems that would otherwise have been needed, had the PRACH request transmissions utilized a dedicated modem for each PRACH request, for each channel.

15 Claims, 9 Drawing Sheets

SYSTEM AND METHOD FOR EFFICIENTLY USING CHANNEL UNIT HARDWARE TO PROVIDE MULTIPLE NARROWBAND CHANNELS OVERLAID ON A SINGLE WIDEBAND CHANNEL IN A SATELLITE COMMUNICATIONS NETWORK

FIELD OF THE INVENTION

The present invention relates to a system and method for efficiently using modems in satellite communications. More particularly, the invention relates to a method and system for efficiently utilizing wide and narrowband packet data transmission channels through the sharing of wide and narrowband modems.

BACKGROUND OF THE INVENTION

Great advances in the field of wireless communications have been made over the past twenty years, and continue to be made. These advances both improve the quality of communication, e.g., the clarity and reliability of communication, and improve the geographic coverage of such wireless communications. As industry strives to provide a wireless communications capability that covers the entire globe, factors such as economic viability dictate that space-based transceivers be employed as opposed to ground infrastructure. However, systems that employ ground infrastructures remain technologically advantageous and economically preferable in identified population centers where a great deal of bandwidth is required in a relatively small area. Thus, two types of wireless communication, i.e., ground infrastructure cellular, and space-based satellite systems have emerged.

Modems are well-known in the art of digital communications. The word modem is a contraction of the words modulator and demodulator. A modem is typically used to send digital data over in transmission line. The sending modem modulates the data into a signal that is compatible with the transmission line and the receiving modem demodulates the signal back into digital data. Wireless modems are frequently used in cellular and satellite communication systems for converting data into radio signals and visa-versa.

Modems utilize any number of a different modulation schemes that transmit digital data. For example, modems used in transmitting digital data over telephone lines would use frequency shift keying (FSK), phase shift keying (PSK), and quadrature amplitude modulation (QAM). These techniques allow an incredible amount of information to be inserted into the relatively small bandwidth available on normal voice grade phone lines. In satellite communication systems, however, much higher speeds of communication are available through the use of these and other sophisticated modulation techniques.

As discussed above, because of increased use of the Internet, the use of modems has risen substantially. In the early stages of Internet use, the Internet was primarily utilized through conventional landlines, i.e., plain old telephone service (POTS) lines. However, as use of the Internet became more prolific, and users demanded greater accessibility, means for wireless Internet service became established and is now fairly common. However, in many places of the world, where cellular wireless communication systems are not in place to provide telephone or Internet access, satellite communication systems can be used.

FIG. 1 is a block diagram of a satellite telecommunication system. In FIG. 1 satellite 2, located in space 4, transmits via spot beams 8A–8C, data and voice information. Each spot beam 8 comprises not more than 75 communication channels, suitable for packet data transfer, numbered 01 to 75. Each channel can be either 125.0 kHz or 156.25 kHz, as discussed in greater detail below.

The Internet operates in a packet switched environment, as opposed to the circuit switched environment of normal landline (and even most wireless) telephone systems. "Circuit Switched" is the most familiar technique used to build a communications network. It is used for ordinary telephone calls. Circuit switching means that each user has sole access to a circuit (functioning equivalent to a pair of copper wires) during network use. Essentially, it is a direct link, through the paired copper wires, and a network between two end points. "Packet Switching" however is somewhat different then circuit switching. Packet Switching is similar to message switching using short messages. Any message exceeding a network defined maximum length is broken into short units, known as "packets" for transmission. The packets, each with an associated header, are then transmitted individually through the network. In a packet system a number of users may simultaneously receive the transmitted data. Each packet is individually addressed, which is how they get to the correct recipient. In essence, there is no completed direct connection between the sending and receiving units. It is possible, and quite frequently it does happen, that an outgoing link may not be available in which case a packet is placed in a queue until the link become free to use. A packet network is formed by links which connect packet network equipment.

Wireless packet data systems are being developed based on the General Packet Radio Service (GPRS) standard. This has been enhanced for satellite operation, the enhancement being named Geo-Mobile Packet Radio Service (GMPRS) standard. GMPRS is an advanced data transmission mode that does not require a continuous connection to the Internet, as with a standard home modem. Instead, a system that employs GMPRS uses the network only when there is data to be sent, which is more efficient in wireless communication systems, where power and spectrum are scarce resources. The base frequency bandwidth for packet data transfer is either 156.25 kilohertz or 125 kilohertz depending on the configuration used. In addition to packet data transfer (a channel allocated for packet data transfer is referred to as a packet data channel, or PDCH), the same satellite channels are used for packet random access channel (PRACH) requests. A PRACH request is used by a remote terminal to request an allocation of resources (i.e., the channel) in order to transfer data from the terminal. Since the payload requirements for a PRACH request is significantly lower than the packet data transfer, the PRACH occupies only 31.25 kHz. In order to make efficient use of the bandwidth, the modified air interface allows multiply PRACH's to occupy the same space as a single PDCH (in either the 156.25 kilohertz channel, or the 125 kilohertz channel). This is explained with reference to FIG. 2.

FIG. 2 illustrates a first wideband channel for transferring packet data and random access channel requests in a satellite communication system utilizing the GMPRS standard. As seen in FIG. 2, there is an odd frame 201 and an even frame 202. In odd frame 201 and even frame 202, there are eight time slots of 5 milliseconds a piece. Therefore, each channel frame transmission time is 40 milliseconds. The time slots are denoted time slot A (TS-A), time slot B (TS-B), etc. In FIG. 2, the transmission bandwidth is 125.00 kHz. In FIG.

2, TS-A and TS-C through TS-H of odd frame 201 are dedicated to packet data channel (PDCH) transfers. TS-B, however, is dedicated for a PRACH. There are four PRACH transmissions (PR-1, PR-2, PR-3 and PR-4), each occupying 31.25 kilohertz of bandwidth. In even frame 202, however, there is no PRACH transmission. PRACH transmissions occur in an odd frame or an even frame, but not both, in any given channel.

FIG. 3 illustrates a second wideband channel for transferring packet data and random access channel requests in a satellite communication system utilizing the GMPRS standard. Although the transmission bandwidth is 156.25 kHz, it can been seen in odd frame 301, the top frequency band of 31.25 kilohertz is crossed-hatched to represent that no data transmission occurs in that frequency band. Thus, all transmissions occur around the frequency carrier signal from 0–125 kilohertz. In even frame 302, the first 31.25 kHz is cross hatched to represent that no data transmission is occurring in that frequency band. In FIG. 3, TS-C of even frame 302 contains the PRAQCH transmission.

Normally, satellite radio modems (SatMods) are assigned to channels on a fixed basis. SatMod assignment is performed by a device call the Packet Resource Management System (PRMS). When a new channel (or sub-band) is assigned, the PRMS looks through a list of available PRACH SatMods, and assigns the according to which slots are free. As has been discussed, the wideband packet data channels (PDCH) are periodically overlaid with multiple narrowband channels. However, if conventional techniques were used to receive a PRACH transmission as with a PDCH transmission, it would be necessary to provide up to five times the modem hardware then is needed for data transfer alone, at great expense.

FIG. 4 illustrates a first example of an inefficient allocation of satellite radio modems for transferring PDCH and PRACH transmissions utilizing the GMPRS standard. In FIG. 4, SatMod 1 has been assigned to channel 50. It will receive all the packet data transfers (PDCH). However, SatMods 2–5 have been assigned to receive one PRACH transmission each. SatMod 1 can be used for channel 50 odd frame, as well (but not at the same time), but no other channel. SatMods 2–5 can likewise be used only for channel 50 odd and even frames. This is the same for all 75 channels. Therefore, in 75 channels, 75 PDCH SatMods are needed, and 300 PRACH SatMods (75 channels×4 PRACH SatMods/channel=300 PRACH SatMods), for a total of 375 SatMods. The significant component of a SatMod is a high-speed digital signal processor (DSP) that is contained in the SatMod. A SatMod will be considered to be one DSP.

FIG. 5 illustrates a second example of an inefficient allocation of satellite radio modems for transferring packet data and random access channel requests utilizing the GMPRS standard. The allocation of SatMods in FIG. 5 is only slightly more efficient than in FIG. 4. Here, PDCH SatMod 1 is used for PRACH (PR) SatMod for PR-4 (in TS-B), while SatMods 2–4 are used in PR-1, PR-2 and PR-3, respectively. In this example, therefore, for 75 channels, 75 PDCH SatMods are needed, and 225 PRACH SatMods are used (75 channels×3 PRACH SatMods/per channel=225 PRACH SatMods) for a total of 300 SatMods.

FIG. 6 illustrates of a third example of an inefficient allocation of satellite radio modems for transferring packet data and random access channel requests utilizing the GMPRS standard. FIG. 6 represents an inefficient allocation of both SatMods and bandwidth resources. In FIG. 6, SatMod 1 will be used for PDCH transfers in channel 50, even and odd frames. In this case, though, only one PRACH is transmitted, PR-4, alleviating the need for any additional SatMods, because for each channel, the one SatMod for the channel can easily handle the smaller bandwidth PRACH, as well as the much higher bandwidth PDCH transfers. At a minimum, therefore, only 75 SatMods need be used; but, instead of completely utilizing the bandwidth capacity of a time slot in each channel's even and odd frame, only 31.25 kHz (PR-4) of the PRACH timeslot is being used. Alternatively, a single PRACH SatMod can handle the PRACH (in this example PR-4) for each channel, thereby doubling the number of SatMods to 150. In both the 125.0 kHz and 156.25 kHz wideband channel, 75% of the PRACH channel's time slot capacity is wasted.

Thus, there is a need for efficiently using modems in a satellite communication system that transfers packet data and random access channel requests utilizing the GMPRS standard, and a need for efficient utilization of channel bandwidth in such a system.

SUMMARY OF THE INVENTION

It is therefore a general object of the invention to provide a novel system and method to efficiently utilize channel unit hardware in a satellite based communications system that will obviate or minimize problems of the type previously described.

It is therefore an additional object of the invention to efficiently use multiple 125.0 kHz data channels by multiplexing narrowband modems over multiple packet data channels for PRACH, while dedicating a minimum of wideband modems for packet data transfer in a satellite communication system utilizing the GMPRS standard.

It is therefore a further object of the invention to efficiently use multiple 156.25 kHz data channels by multiplexing narrowband modems over packet data channels for PRACH, while dedicating a minimum of wideband modems for packet data transfer in a satellite communication system utilizing the GMPRS standard.

It is yet another object of the invention to implement a system and method utilizing wideband modems, some in a dedicated fashion and some in a multiplexed fashion, to efficiently and economically use wideband modems for transferring packet data and packet random access channel requests in a satellite communication system utilizing the GMPRS standard for packet data transfers.

It is therefore an object of the invention to efficiently use multiple 125.0 kHz data channels by multiplexing narrowband modems over multiple packet data channels for PRACH, while dedicating a minimum of wideband modems for packet data transfer in a satellite communication system utilizing the GMPRS standard.

It is therefore a further object of the invention to efficiently use multiple 156.25 kHz data channels by multiplexing narrowband modems over multiple packet data channels for PRACH, while dedicating a minimum of wideband modems for packet data transfer in a satellite communication system utilizing the GMPRS standard.

It is yet another object of the invention to implement a system and method utilizing wideband modems, some in a dedicated fashion and some in a multiplexed fashion, to efficiently and economically transfer packet data and random access channel requests in a satellite communication system utilizing the GMPRS standard for packet data transfers.

A system is shown for transmitting data and control information in a satellite telecommunication system, which comprises a plurality of transmission channels, each transmission channel comprised of a plurality of time slots and having a first bandwidth and at least one of the time slots dedicated to transmitting control information, while the remainder of the time slots transmit data information. The control information time slot transmission is divided into a plurality of transmissions of a second bandwidth. The system further contains a plurality of first type modems, each first type modem configured and dedicated to receive the data information from a separate transmission channel, and a second type modem configured to receive the control information from each of the plurality of transmission channels in a time shared mode.

BRIEF DESCRIPTION OF THE DRAWINGS

The novel features believed characteristic of the invention are set forth in the appended claims. The invention itself, however, as well as other features and advantages thereof will be best understood by reference to the detailed description of the specific embodiments which follows, when read in conjunction with the accompanying drawings, in which:

DETAILED DESCRIPTION OF THE PREFERRED EMBODIMENT

The various features of the preferred embodiment will now be described with reference to the figures, in which like parts are identified with same referenced characters.

Figure 7:
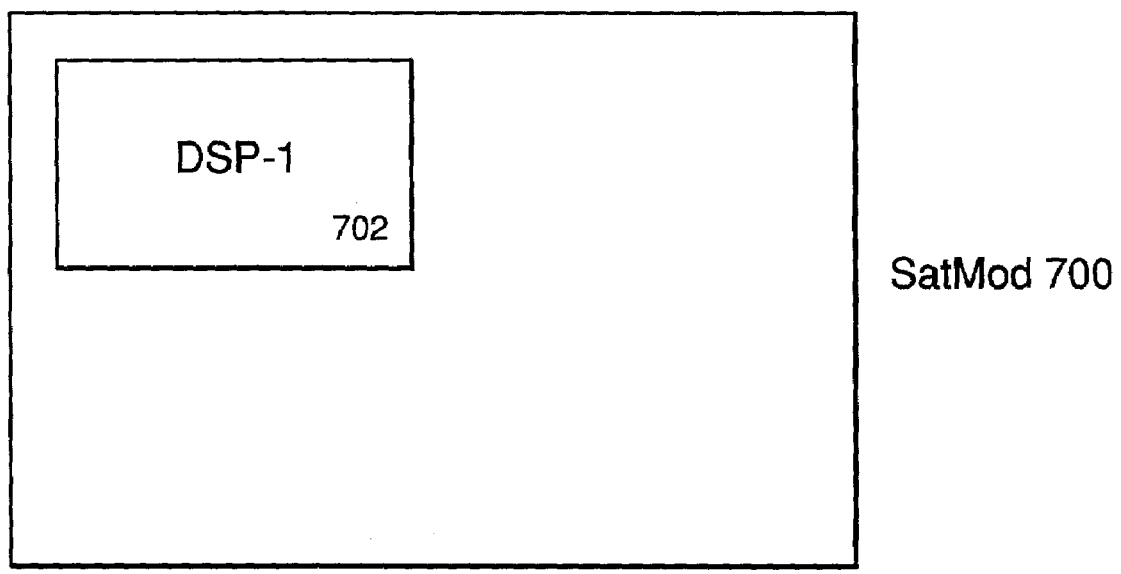
FIG. 7 is a block diagram of a first satellite radio modem used in either a first or second embodiment of the invention.

FIG. 7 is a block diagram of a first satellite radio modem used in either a first or second embodiment of the invention. Satellite radio modem (SatMod) 700 illustrated in FIG. 7 is defined as containing 1 digital signal processor, DSP-1 702. DSP-1 702 has a bandwidth of 156.25 kHz. Therefore, each modem is capable of receiving four PRACH transfers (4×31.25 kHz=125.0 kHz) or one PDCH transfer. However, in addition to the DSP, SatMod 700 requires additional hardware (power supplies, internal processing capabilities, communications buses, input/output hardware, etc), as is well known in the art. These have been omitted for sake of clarity.

Figure 8:
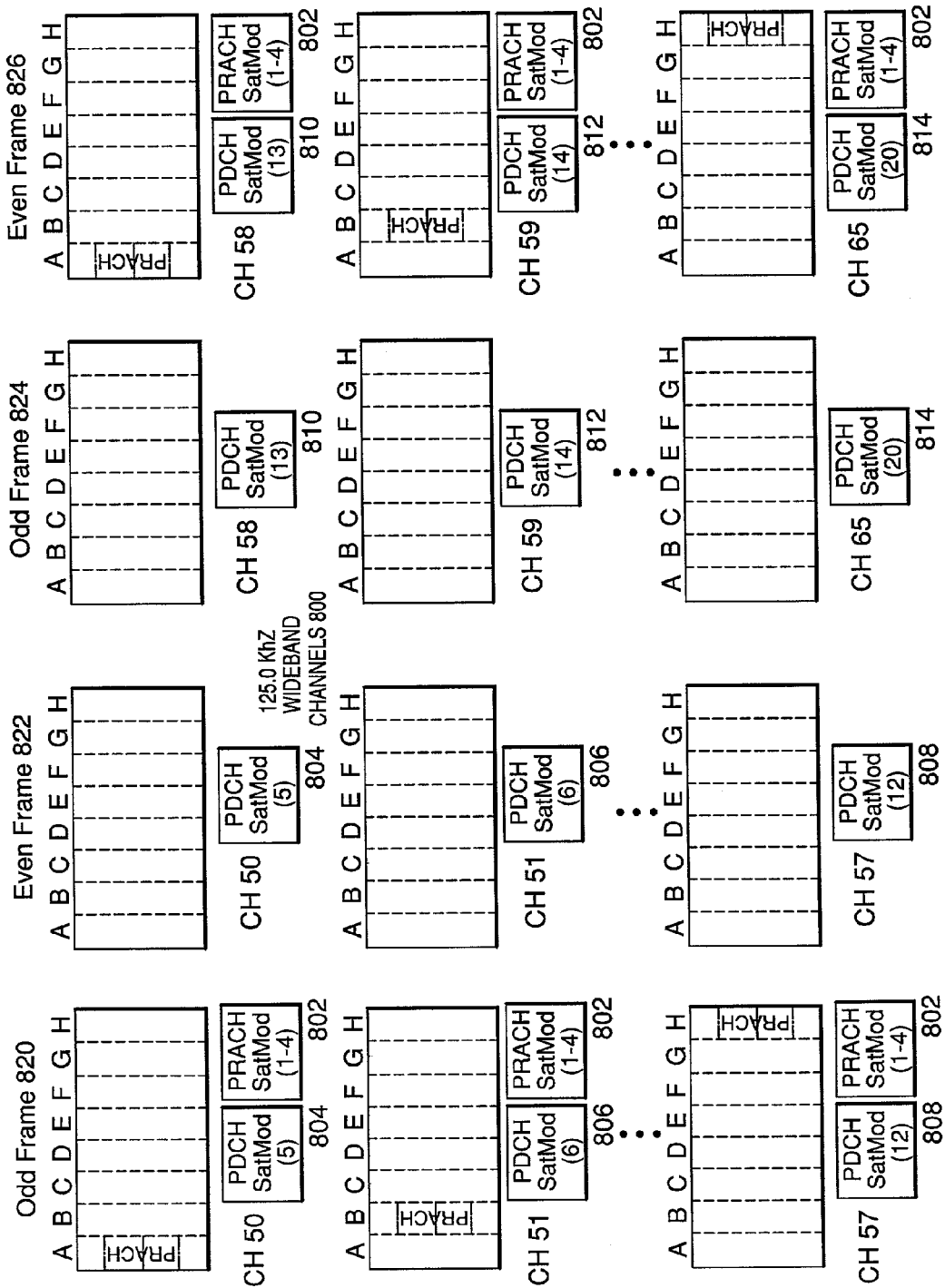
FIG. 8 illustrates a first embodiment of the invention.

FIG. 8 illustrates a first embodiment of the invention. In the first embodiment of the invention, two groups of SatMods are utilized. The first group is allocated to a PDCH transmissions. The second group is allocated for PRACH use, but shared over multiple (16) channels. This accommodation of assigned and timeshare satellite radio modems allows maximum bandwidth efficiency at minimum equipment usage.

In FIG. 8, 4 SatMods 700 are assigned as a PRACH SatMod 802, each one capable of receiving one PRACH transmission for not only one channel, but for fifteen others, for a total of sixteen channels. A packet resource management system (PRMS) assigns the PRACH SatMods for each channel as it comes into use. All channel transmissions are synchronized by the PRMS. As the first channel is assigned, a group of four SatMods is assigned to the channel for PRACH use, in the next available time slot. When another channel is requested, the four SatMods are assigned to the channel for PRACH use, but in the next available time slot. The time slot assignments begin with the odd frame, and then the even frame.

In FIG. 8, channel 50 is the first to be assigned for PDCH and PRACH use. Since no other channel is in use, time slot A will be used for PRACH transmissions and SatMod 802, which contains SatMods (1–4) (this is for purposes of illustration only, of course; the physical configuration of the SatMods may be different dependant upon the circumstances of the design of the satellite system; here, the first 4 SatMods are grouped together, numbered 1–4, and given element number 802 in FIG. 8. This same convention is used in the discussion regarding FIG. 10).

SatMod (5) 804 is assigned for PDCH transmissions. The PRMS assigns time slot A for PRACH use, and time slots B–E for PDCH use. Since this was the first channel to be assigned, only odd frame 820 has PRACH SatMods assigned to it. Even frame 822 is dedicated solely to PDCH use, and SatMod (5) 804 will accommodate those transmissions.

Eventually, the system requires additional PDCH and PRACH transmission capability, and channel 51 is assigned next. Because all channel transmissions are synchronous, the next available time slot will be assigned for PRACH use. It is not necessarily the case that it be the next sequential time slot, as channel use might be sporadic, and some channels are used for different periods of time, but, for purposes of this discussion, the next available time slot is the next sequential time slot. Thus, time slot B of odd frame 820 will be used by SatMods (1–4) for PRACH transmissions. Therefore, for the first 5 milliseconds of channel transmission, PRACH SatMods (1–4) 802 tune to channel 50 during time slot A and then tune to channel 51 during time slot B, for the next 5 milliseconds, and the PRACH transmissions contained therein.

It also might be the case that there are less than four PRACH transmissions occurring. But up to four PRACH transmissions can be accommodated in a time slot, as previously discussed. Also, as previously discussed, even frame 822 of channel 51 has no PRACH transmissions, only PDCH transmissions, and this is why there are no PRACH SatMods shown corresponding to channel 51, even frame 820. When another channel must be assigned (and presuming channels 50 and 51 are still in use) the PRMS can use any unassigned time slot, i.e., not time slots A and B, as these have already been assigned for PRACH use by channels 50 and 51, respectively. This process continues until all the time slots of the odd channel are utilized, and in channel 57 (the eighth channel) time slot H is being used for PRACH transmissions, and time slots A–G are used for PDCH transmissions.

Once all eight time slots of the odd frames of the selected channels have been assigned for PRACH transmissions and thus SatMods (1–4) 802, the time slots for even frames of selected channels will be used. The next available channel might be channel 58, and time slot A of even frame 826 is assigned for PRACH use, with SatMods (1–4) 802. Time slots B–H of even frame 826 of channel 58 will carry PDCH transmissions. Odd frame 824 of channel 58 is dedicated to PDCH use, and SatMod (13) 810 will be used for that purpose. This continues until, in a group of 16 channels (and again, not necessarily sequential channels), all the time slots of the odd frames (for a first sub-group) of eight channels have been assigned for PRACH use and all the time slots of the even frames (for a second sub-group) of eight channels have also been assigned for PRACH use.

Thus, for any group of 16 channels (in FIG. 8, 16 sequentially numbered channels), a total of 20 SatMods will be used: SatMods 1–4 for PRACH use across all 16 channels, and SatMods 5–20 for PDCH use. This means 1.25 SatMods are needed for each channel in the configuration according to this embodiment of the invention. Had this not been the case, that is, if a separate group of PRACH SatMods were to be used for each channel, a total of 80 SatMods would have been necessary, one for PDCH use for each channel (16 SatMods) and four for PRACH use for each channel (64 SatMods), for a per-channel allocation of 5 SatMods/channel (80/16=5). This represents a tremendous savings in physical hardware, which correlates to a truly significant savings in power use, space and heat radiation requirements.

Table 1, shown below, summarizes the SatMod assignments for the first group of 8 channels, and Table 2 summarizes the SatMod assignments for the second group of 8 channels. Channels 50–65 are used for exemplary purposes only. Under the column heading "Transmission Usage" are the designations PDCH (packet data transfer) SatMods, which are fixed to one channel and PRACH SatMods which are time shared between all 16 channels.

TABLE 1

| Channel No. | Frame | Time Slot | Transmission Usage | SatMod No. |
|---|---|---|---|---|
| 50 | O | A | PRACH | 1–4 |
|  |  | B–H | PDCH | 5 |
|  | E | A–H | PDCH | 5 |
| 51 | O | B | PRACH | 1–4 |
|  |  | A, C–H | PDCH | 6 |
|  | E | A–H | PDCH | 6 |
| 52 | O | C | PRACH | 1–4 |
|  |  | A, B, D–H | PDCH | 7 |
|  | E | A–H | PDCH | 7 |
| 53 | O | D | PRACH | 1–4 |
|  |  | A–C, E–H | PDCH | 8 |
|  | E | A–H | PDCH | 8 |
| 54 | O | E | PRACH | 1–4 |
|  |  | A–D, F–H | PDCH | 9 |
|  | E | A–H | PDCH | 9 |
| 55 | O | F | PRACH | 1–4 |
|  |  | A–E, G, H | PDCH | 10 |
|  | E | A–H | PDCH | 10 |
| 56 | O | G | PRACH | 1–4 |
|  |  | A–F, H | PDCH | 11 |
|  | E | A–H | PDCH | 11 |
| 57 | O | H | PRACH | 1–4 |
|  |  | A–G | PDCH | 12 |
|  | E | A–H | PDCH | 12 |

TABLE 2

| | | | | |
|---|---|---|---|---|
| 58 | O | A–H | PDCH | 13 |
|  | E | A | PRACH | 1–4 |
|  |  | B–H | PDCH | 13 |
| 59 | O | A–H | PDCH | 14 |
|  | E | B | PRACH | 1–4 |
|  |  | A, C–H | PDCH | 14 |
| 60 | O | A–H | PDCH | 15 |
|  | E | C | PRACH | 1–4 |
|  |  | A, B, D–H | PDCH | 15 |
| 61 | O | A–H | PDCH | 16 |
|  | E | D | PRACH | 1–4 |
|  |  | A–C, E–H | PDCH | 16 |
| 62 | O | A–H | PDCH | 17 |
|  | E | E | PRACH | 1–4 |
|  |  | A–D, F–H | PDCH | 17 |
| 63 | O | A–H | PDCH | 18 |
|  | E | F | PRACH | 1–4 |
|  |  | A–E, G, H | PDCH | 18 |
| 64 | O | A–H | PDCH | 19 |
|  | E | G | PRACH | 1–4 |
|  |  | A–F, H | PDCH | 19 |
| 65 | O | A–H | PDCH | 20 |
|  | E | H | PRACH | 1–4 |
|  |  | A–G | PDCH | 20 |

Figure 1:
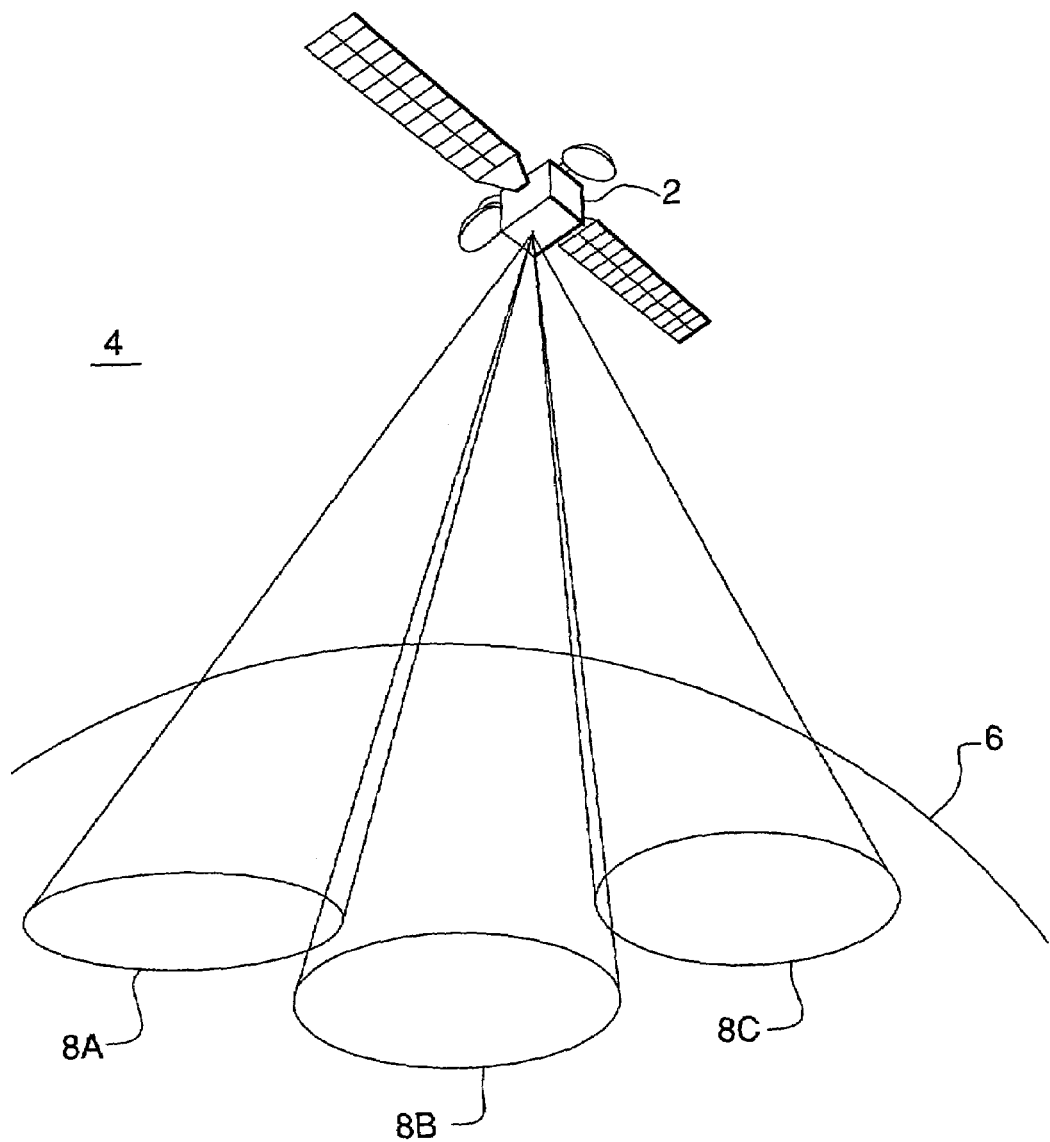
FIG. 1 is a block diagram of a satellite communication system.
Figure 2:
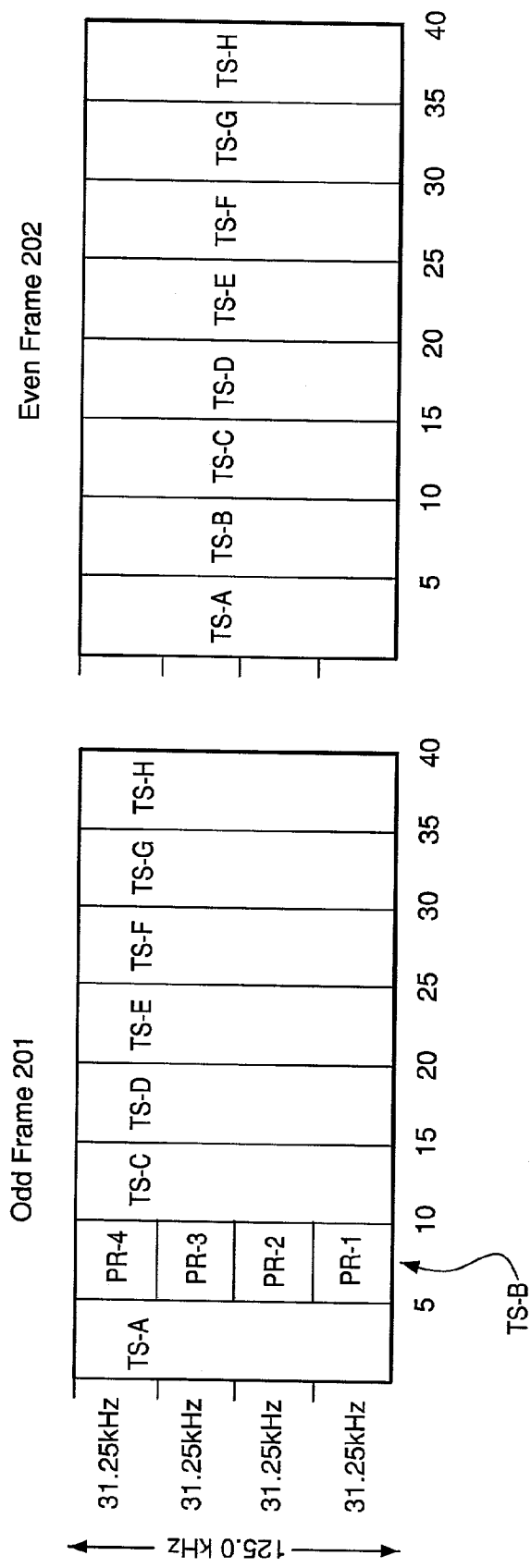
FIG. 2 illustrates a first wideband channel for transferring packet data and random access channel requests in a satellite communication system utilizing the GMPRS standard.
Figure 3:
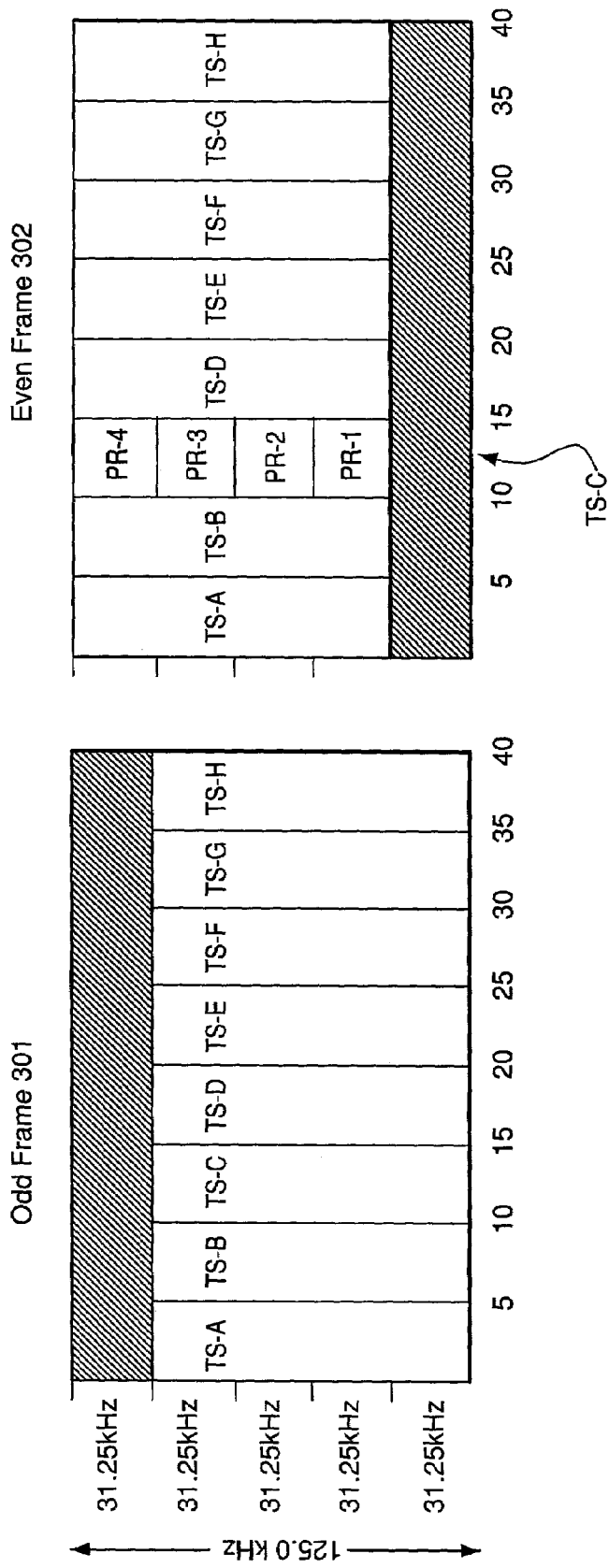
FIG. 3 illustrates a second wideband channel for transferring packet data and random access channel requests in a satellite communication system utilizing the GMPRS standard.
Figure 4:
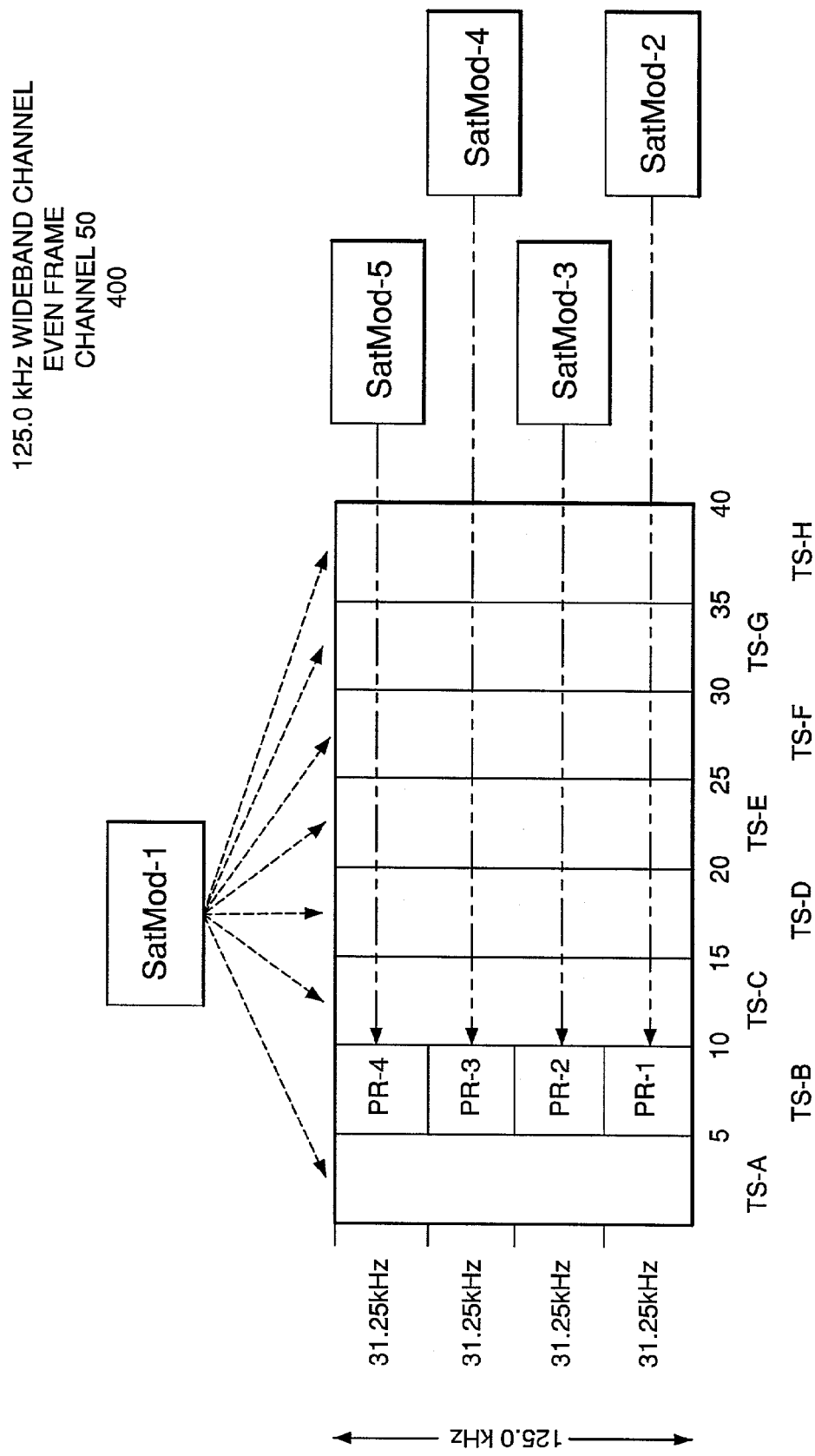
FIG. 4 illustrates a first example of an inefficient allocation of satellite radio modems for transferring packet data and random access channel requests utilizing the GMPRS standard.
Figure 5:
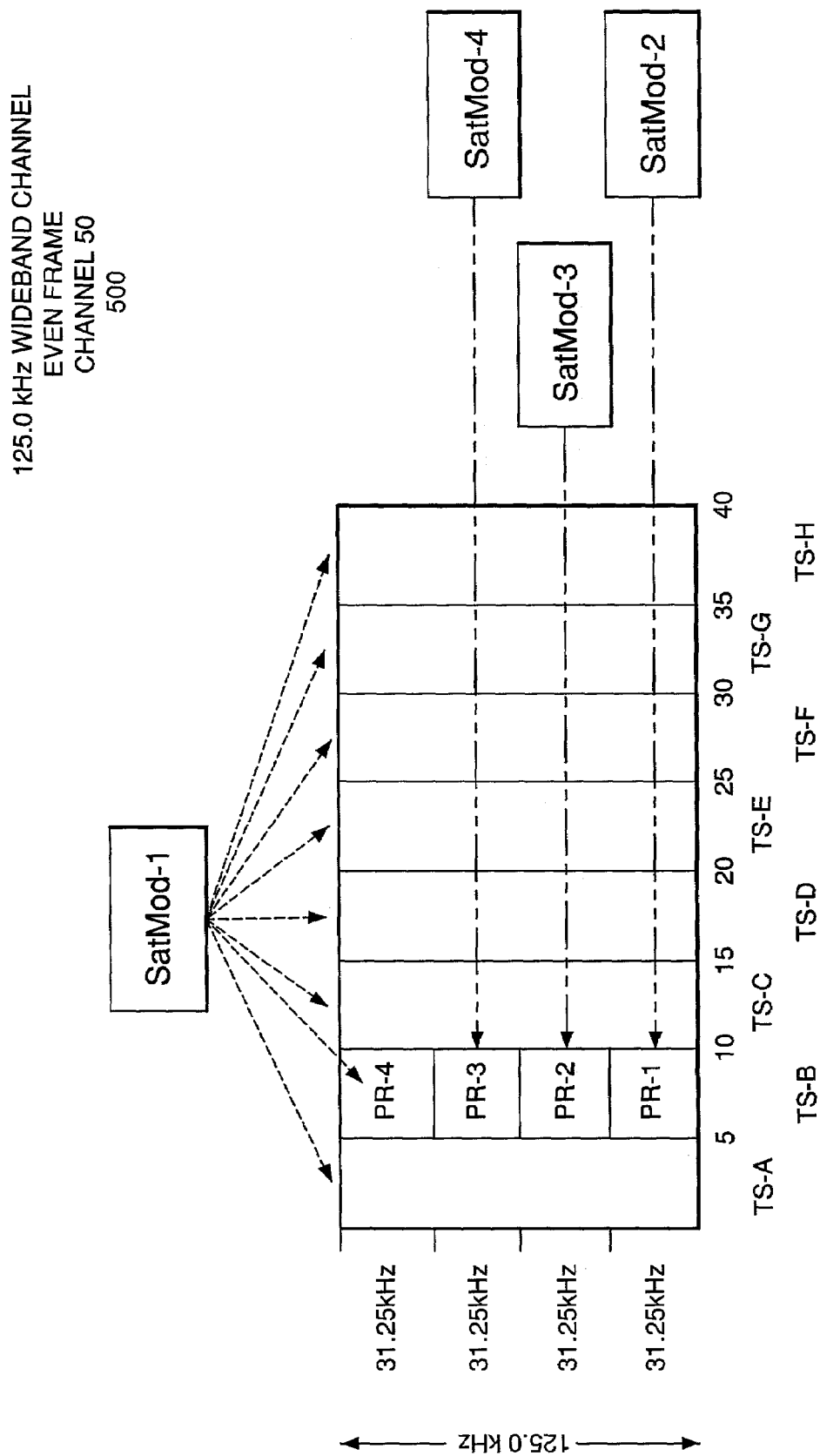
FIG. 5 illustrates a second example of an inefficient allocation of satellite radio modems for transferring packet data and random access channel requests utilizing the GMPRS standard.
Figure 6:
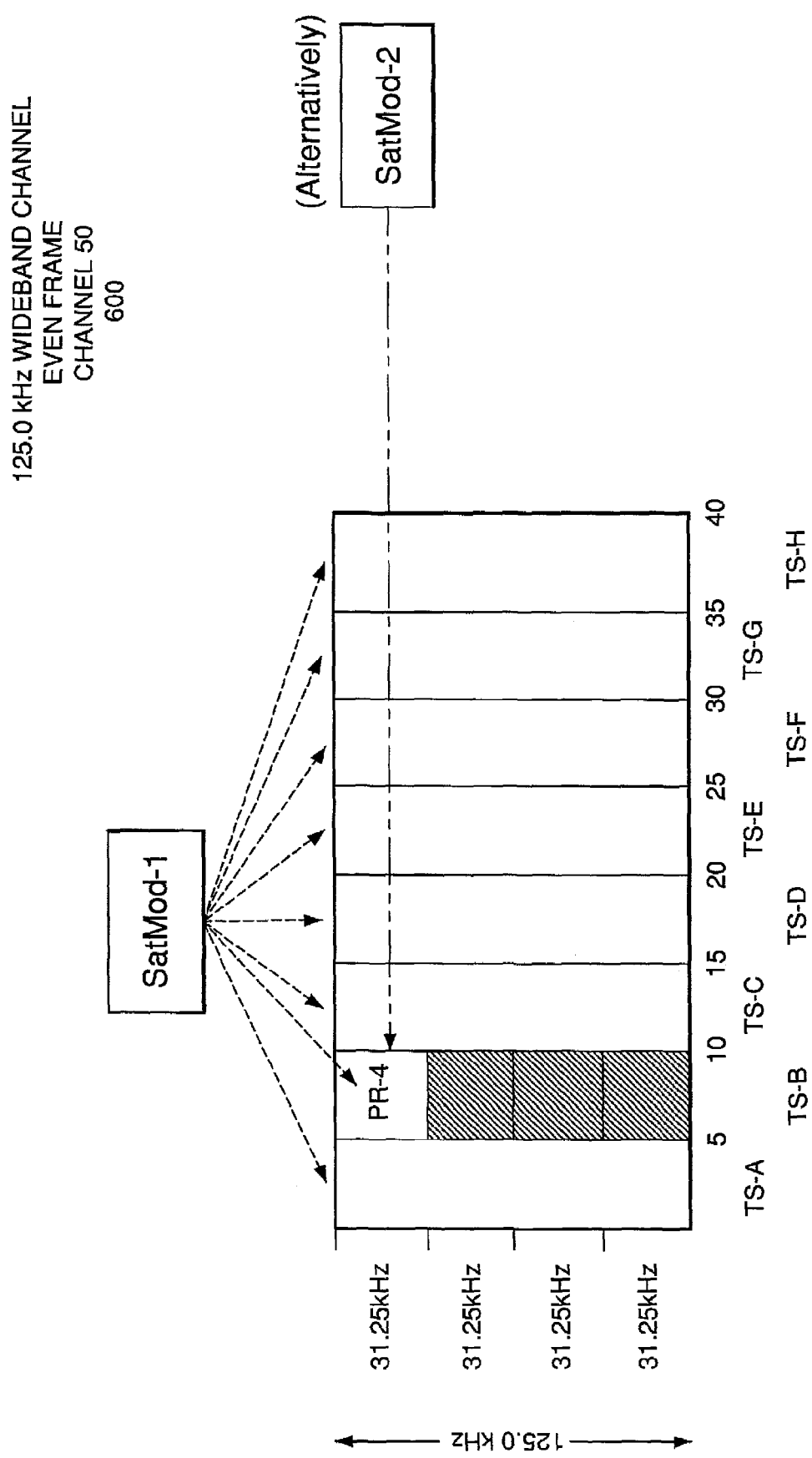
FIG. 6 illustrates a third example of an inefficient allocation of satellite radio modems for transferring packet data and random access channel requests utilizing the GMPRS standard.

It is clearly more efficient to timeshare the PRACH request SatMods over 16 channels than any of the embodiments shown in FIGS. 4–6. In a complete satellite communication system, with 75 channels, the total number of SatMods required is as follows:

75 channels×1 PDCH SatMod/channel=75 PDCH SatMods 75 channels×4 PRACH SatMod/16 channels=18.75 PRACH SatMods This yields a total of 94 SatMods, as compared to the best case of 225 SatMods in the most efficient allocation of SatMods (according to FIG. 4) and 375 SatMods in the most inefficient allocation of SatMods (according to FIG. 5), when utilizing all 4 possible PRACH requests in a time slot.

Figure 9:
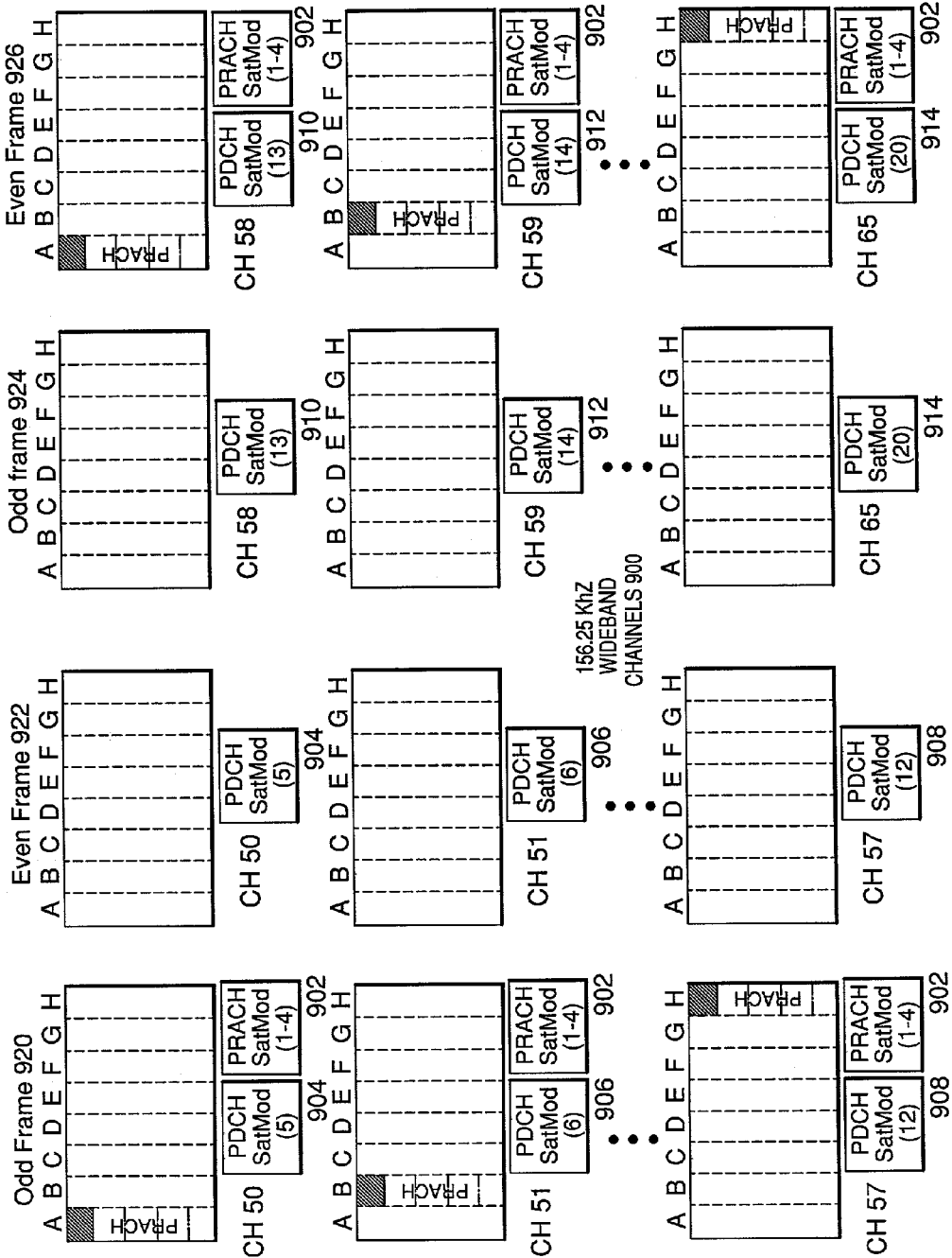
FIG. 9 illustrates a second embodiment of the invention.

FIG. 9 shows essentially the same information as in FIG. 8, except for a 156.25 kHz wideband channel.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than the preceding description.

What is claimed is:

1. A system for transmitting data and control information in a satellite telecommunication system, comprising:
a plurality of first type modems, each first type modem configured and dedicated to receive the data information from a respective one of plurality of separate transmission channels, each said transmission channel comprising a plurality of time slots and having a first bandwidth, at least one of the time slots being dedicated to transmitting control information, the remainder of the time slots transmitting data information, and the control information time slot transmission being divided into a plurality of transmissions of a second, smaller bandwidth; and
a plurality of second type modems, configured to receive the control information from the plurality of transmission channels in a time shared mode.

2. The system of claim 1, further comprising that each of the plurality of second type of modems is dedicated to one of the plurality of control information transmissions of a second smaller bandwidth.

3. The system of claim 1, wherein the transmission channels are configured into an even transmission frame, and an odd transmission frame.

4. The system of claim 3, wherein the number of transmission channels equals 16.

5. The system of claim 3, wherein the number of time slots equals eight.

6. The system of claim 1, wherein the data information and control information are for use with the Internet.

7. The system of claim 6, wherein the data information comprises packet data.

8. The system of claim 6, wherein the control information comprises packet channel requests.

9. The system of claim 1, wherein the first bandwidth equals 125 kHz.

10. The system of claim 1, wherein the first bandwidth equals 156.25 kHz.

11. The system of claim 1, wherein the first type modem comprises a digital signal processor.

12. The system of claim 1, wherein the second type modem comprises a digital signal processor.

13. A method for transmitting Internet information in a satellite telecommunication system comprising:

transmitting Internet information in a transmission channel; and receiving the Internet information in both a first modem and a second modem; and wherein the transmission channel is divided into an even and odd frame; and wherein the Internet information is comprised of a first type of information and a second type of information; and further comprising:

receiving the first type of information in a plurality of first modems, each of the first modems dedicated to a separate transmission channel; and receiving the second type of information, from a plurality of transmission channels, in a plurality of second modems in a time shared basis.

14. The method according to claim 13, wherein the first type of information is transmitted in a first plurality of time slots; and the second type of information is transmitted in a second plurality of time slots.

15. The method according to claim 13, wherein the first type of information is data information, and the second type of information is control information.

* * * * *